US00RE38125E

(19) United States
(12) Reissued Patent
Shibata et al.

(10) Patent Number: US RE38,125 E
(45) Date of Reissued Patent: May 27, 2003

(54) GARNISH MEMBERS HAVING AN AIR BAG

(75) Inventors: Minoru Shibata, Inazawa (JP); Katsuhiro Katagiri, Kagamigahara (JP); Akiyoshi Nagano, Aichi-Ken (JP); Hiroki Tsuge, Ichinomiya (JP); Toshinori Tanase, Gifu-ken (JP)

(73) Assignee: Toyoda Gosei Co., Ltd., Aichi-ken (JP)

(21) Appl. No.: 09/593,652

(22) Filed: Jun. 9, 2000

Related U.S. Patent Documents

Reissue of:
(64) Patent No.: 5,791,683
Issued: Aug. 11, 1998
Appl. No.: 08/815,464
Filed: Mar. 11, 1997

(30) Foreign Application Priority Data

Mar. 13, 1996 (JP) ..... 8-056333

(51) Int. Cl.[7] ..... B60R 21/22
(52) U.S. Cl. ..... 280/730.2; 280/728.3; 280/730.1
(58) Field of Search ..... 280/730.2, 728.1, 280/728.3, 728.2, 743.2, 749

(56) References Cited

U.S. PATENT DOCUMENTS 5,755,457 A * 5/1998 Specht ..... 280/730.2

FOREIGN PATENT DOCUMENTS

| | | | |
|---|---|---|---|
| GB | 2261636 | * | 5/1993 |
| GB | 2 278 812 A | | 12/1994 |
| JP | 03276844 | * | 12/1991 |
| JP | 6-227340 | | 8/1994 |
| JP | 06227340 | * | 8/1994 |
| JP | 07117605 | * | 5/1995 |

* cited by examiner

*Primary Examiner*—Eric Culbreth
(74) *Attorney, Agent, or Firm*—Posz & Bethards, PLC

(57) ABSTRACT

Garnish members according to this invention are installed and fixed to peripheries of a door opening in the interior of a vehicle body. The garnish members have an air bag therein and include elongate garnish bodies disposed in the interior of a vehicle body fixing portions. The fixing portions are hinged to the garnish bodies at a rear side of the garnish bodies and can be fixed to the body. The fixing portions include brackets capable of maintaining folding conditions of the air bag, which brackets can be ruptured when the air bag is inflated.

23 Claims, 11 Drawing Sheets

GARNISH MEMBERS HAVING AN AIR BAG

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to garnish members having an air bag. The garnish members are installed and fixed to peripheries of a door opening in the interior of a vehicle body.

2. Description of Related Art Conventionally, a technology described in Japanese Patent Publication No. Hei 6-227340 (see FIGS. 1, 2, 3 of that document) has been well known as a technology in which an air bag apparatus is disposed at a position in the interior of a vehicle body where garnish members are disposed.

According to the above construction, an air bag and an inflator of the air bag apparatus are installed and fixed to a vehicle body successively together with the garnish members. Thus, it takes much time and trouble to install the air bag and the garnish members to the body at a position in which the garnish members are disposed.

SUMMARY OF THE INVENTION

An object of the present invention is to solve the above described problem and provide garnish members having an air bag which allow installation and fixing of an air bag and garnish members at a position in which the garnish members are disposed.

The object of the present invention is achieved by garnish members having an air bag therein. The garnish members are constructed and arranged to be installed and fixed to peripheries of a door opening in the interior of a vehicle body. The garnish members comprise: elongate garnish bodies constructed and arranged to be disposed in the interior of the vehicle body; fixing portions hinged to the garnish bodies at a rear side of the garnish bodies, the fixing portions being adapted to be fixed to the body. The fixing portions temporarily fix an air bag to the body so that the air bag can be mounted on the body. Brackets are provided at the fixing portions so as to maintain folding conditions of the air bag, the brackets can also be ruptured when the air bag is inflated.

The garnish members according to the present invention are temporarily fixed to the fixing portions such that the air bag can be mounted and fixed to the body. Thus, if the fixing portions of the garnish members are installed and fixed to the body, the air bag can be disposed at a predetermined position on the body.

That is, if the fixing portion is installed and fixed to the body, the air bag can be installed and fixed to the body easily.

After the air bag is installed and fixed, if inflation gas is supplied into the air bag from an inflator, the air bag begins to be inflated so that it ruptures the brackets maintaining its folded condition. Further, the air bag opens the garnish bodies which are hinged to the fixing portions. Thus, the air bag can be inflated largely such that there occurs no obstacle to an activation of the air bag apparatus.

Therefore, with the garnish members according to the present invention, the air bag is temporarily fixed thereto prior to installation and fixing to the body, and if the garnish members are disposed on the body, the air bag can be disposed at a predetermined position. Thus, installation and fixing of the air bag and the garnish members to the body can be achieved easily.

DESCRIPTION OF THE PREFERRED EMBODIMENTS

Hereinafter, embodiments of the present invention will be described with reference to the accompanying drawings. The present invention is not restricted to the embodiments shown herein. All modifications of factors in claims and matters equivalent to those factors are included in a scope of the claims.

Figure 1:
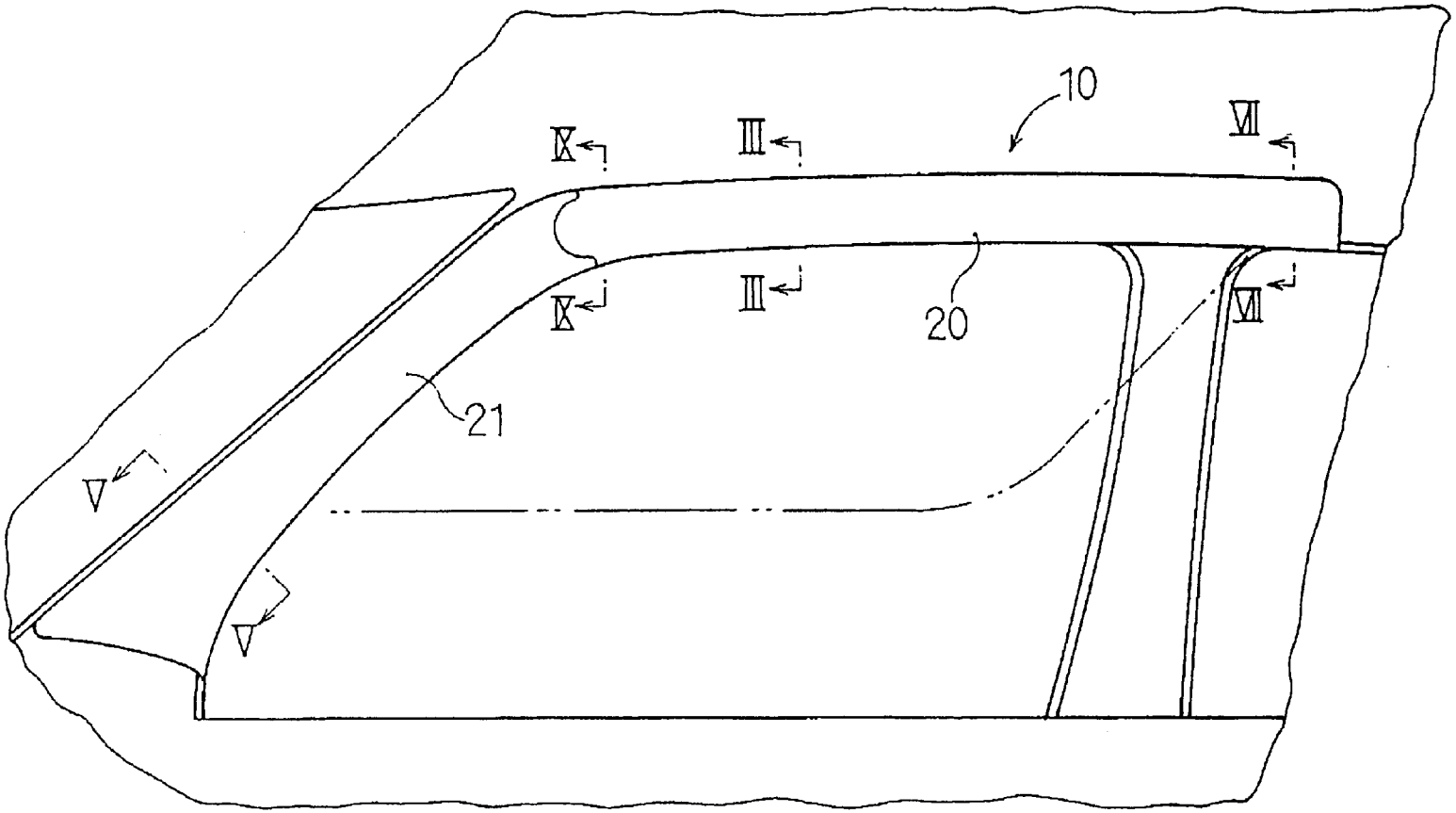
FIG. 1 is a view showing a state in which garnish members according to the first embodiment of the present invention are installed on a vehicle body.
Figure 2:
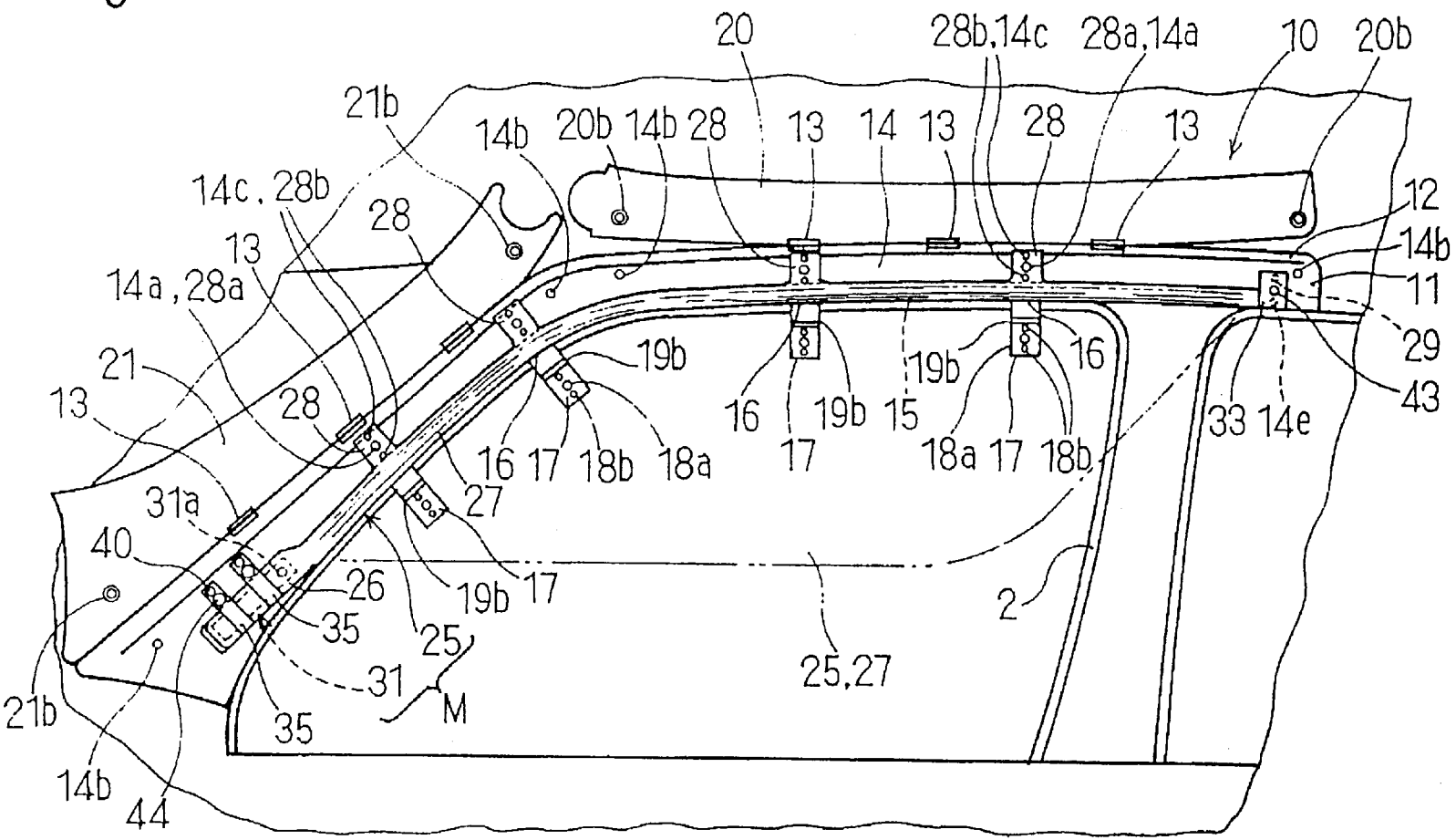
FIG. 2 is a view showing a state in which the garnish members according to the same embodiment and brackets are opened from fixing portions.

As shown in FIGS. 1 and 2, garnish members 10 according to a first embodiment of the present invention are disposed in a section from a front pillar to a roof side rail on a circumference of a door opening inside of a vehicle body. The garnish members 10 contain an air bag apparatus M. The air bag apparatus comprises an air bag 25 and an inflator 31 for supplying inflation gas to the air bag 25.

The air bag 25 comprises a cylindrical portion 26 and a bag body 27. The cylindrical portion 26 is a cylinder having a closed bottom. The bag body 27 is formed so as to be inflated in a diamond-shaped fashion. The cylindrical portion 26 forms a portion connecting with the inflator 31. The cylindrical portion 26 is constructed so as to surround the inflator 31 according to this embodiment.

Figure 7:
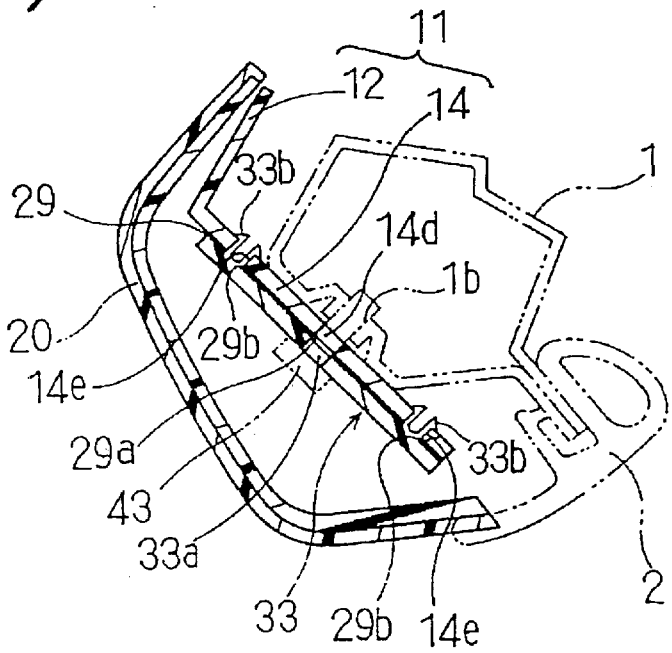
FIG. 7 is a sectional view of the garnish member taken along the lines VII—VII of FIG.
Figure 8:
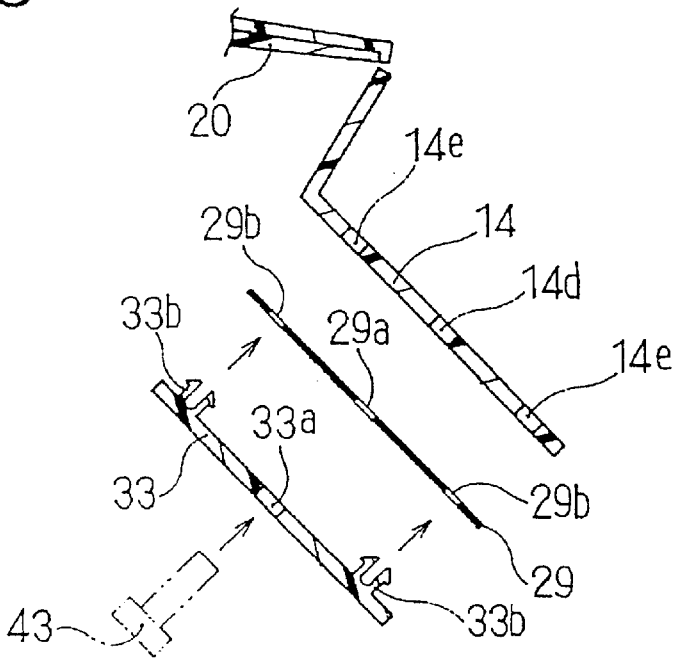
FIG. 8 is a view showing a state in which the air bag is temporarily fixed at a position shown in FIG. 7.

As shown in FIGS. 2, 7, and 8, a generally rectangular-shaped mounting piece 29 is formed at an end of the bag body 27. The mounting piece 29 has a mounting hole 29a in the center thereof and two fixing holes 29b located around the mounting hole 29a.

Figure 3:
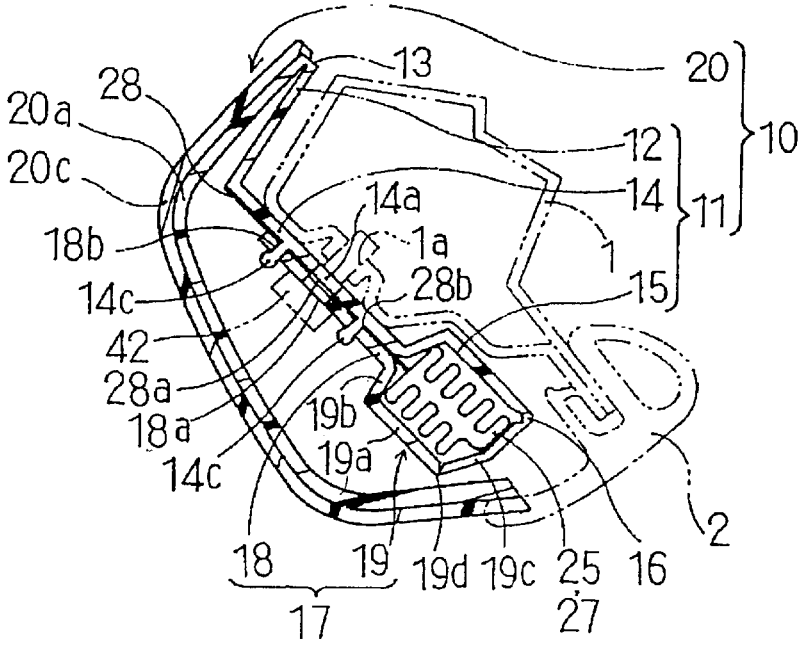
FIG. 3 is a sectional view of the garnish member taken along the lines III—III of FIG.
Figure 4:
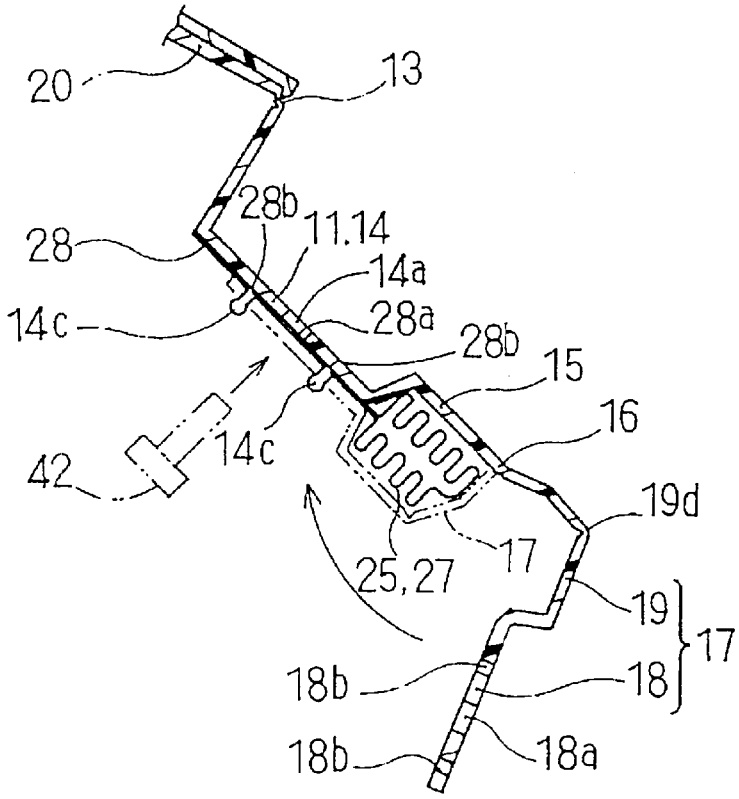
FIG. 4 is a view showing a state in which the air bag is temporarily fixed at a position shown in FIG. 3.

As shown in FIGS. 2–4, four generally rectangular-shaped mounting pieces 28 are formed on an upper edge of the bag body 27 disposed between the cylindrical portion 26 which is a portion connecting with the inflator 31 and the mounting piece 29 at the end of the bag body 27. Each of the mounting pieces 28 has a mounting hole 28a located in the center thereof and two fixing holes 28b located around the mounting hole 28a.

These mounting pieces 28, 29 are portions for mounting the air bag 25 temporarily on a fixing portion 11 of the garnish member 10, which will be described later. Further, these mounting pieces 28, 29 are portions for fixing the air bag 25 to a body 1 of a vehicle. Meanwhile, reference numeral 2 denotes a weather strip.

The inflator 31 is of a cylindrical shape. As shown in FIG. 2, the inflator 31 has a gas injecting port 31 a at an end thereof. This inflator 31 is surrounded by the cylindrical portion 26 of the air bag 25. The inflator 31 is temporarily fixed to the fixing portion 11 of the garnish member 10 by utilizing two clamps 35 and clips 40. Further, the inflator 31 is fixed to the body 1 by utilizing two clamps 35 and bolts 44.

Figure 5:
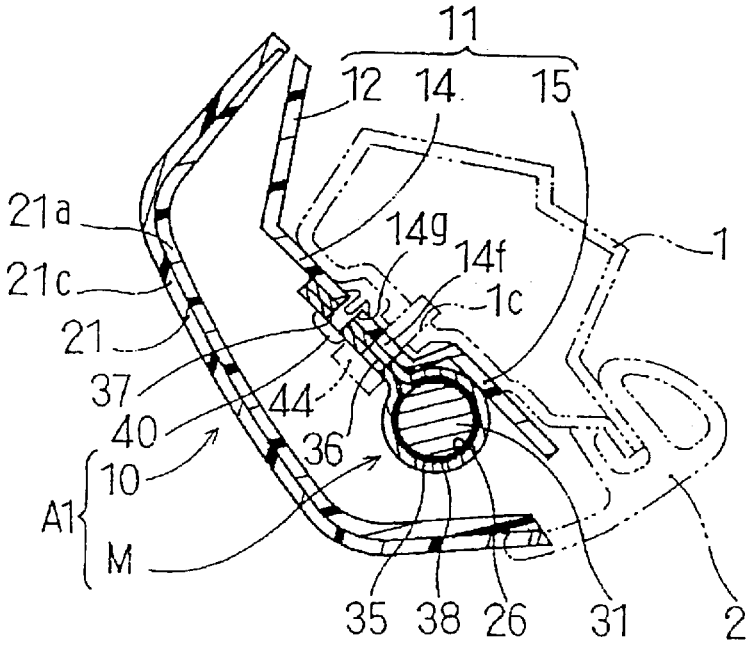
FIG. 5 is a sectional view of the garnish member taken along the lines V—V of FIG. 1.
Figure 6:
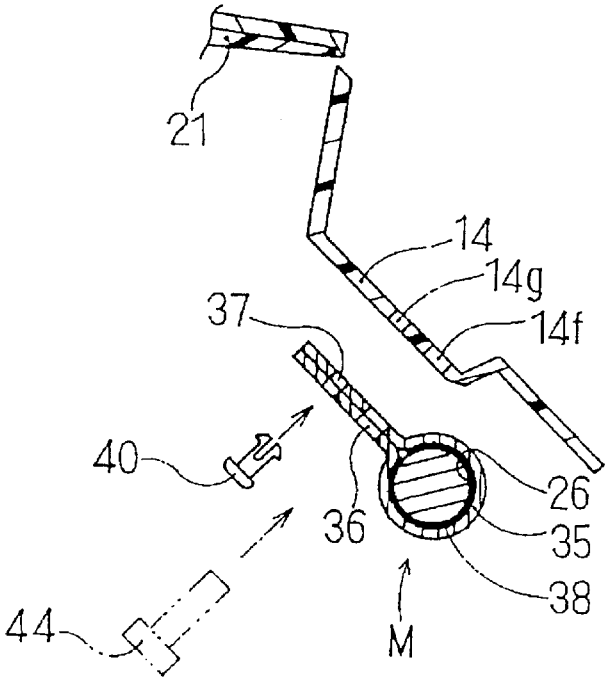
FIG. 6 is a view showing a state in which the air bag is temporarily fixed at a position shown in FIG. 5.

As shown in FIGS. 2, 5, and 6, each of the clamps 35 is a belt made preferably of synthetic resin, sheet metal or the like which is constructed in a U-shaped form in cross-section. Each of the clamps has cushion members 38 made of rubber or the like at a portion for surrounding the inflator 31. When each of the clamps 35 surrounds the inflator 31, each of the clamps 35 also surrounds the cylindrical portion 26 of the air bag 25. Each of the clamps 35 has a mounting hole 36 and a fixing hole 37 at a portion thereof overlapped to surround the inflator 37. A clip 40 is inserted into the fixing hole 37. The clip 40 is inserted into a fixing hole 14g provided in the fixing portion 11 of the garnish member 10 to fix a circumferential part around the fixing hole 14g. Thus, the clip 40 temporarily fixes the inflator 31, with respect to the air bag cylindrical portion 26. A bolt 44 is inserted into the mounting hole 36. The bolt 44 is engaged with a mounting hole 1c. Thus, the bolt 44 fixes the inflator 31 and the air bag cylindrical portion 26 to the body 1.

The garnish members 10 are made of synthetic resin such as polypropylene such that it is elongated having substantially inverse V-shaped form as viewed from the front. The garnish members 10 are disposed along the front pillar to the roof side rail. The garnish members 10 comprise the fixing portions 11 and two garnish bodies 20, 21. The fixing portion 11 is a portion to be fixed to the body 1. The garnish bodies 20, 21 are portions for covering the air bag 25 and the inflator 31. Then, the garnish bodies 20, 21 are hinged to the fixing portion 11 so that they can be opened when the air bag 25 is inflated.

As shown in FIGS. 2–4, the fixing portion 11 comprises a mounting plate 14, a connecting piece 12 and a concave storage concave portion 15. The mounting plate 14 is a flat plate. The connecting piece 12 is bent at an upper edge of the mounting plate 14 and is extended. The concave storage portion 15 extends with a L-shaped cross-section below a lower edge thereof.

The upper edge of the connecting piece 12 is connected with the respective garnish body 20, 21, via a plurality of integral hinges 13.

As shown in FIGS. 5 and 6, the mounting plate 14 has two holes, mounting hole 14f and fixing hole 14g in the vicinity of a portion in which the inflator 31 is disposed. The mounting holes 14f and the fixing holes 14g are disposed so as to correspond to the two clamps 35. Then, the aforementioned bolt 44 is inserted into the respective mounting holes 14f. The aforementioned clip 40 is inserted into the respective fixing holes 14g. The clips 40 fix the peripheral part around the respective fixing holes 14g.

As shown in FIGS. 3 and 4, the mounting plate 14 has a mounting hole 14a and two fixing legs 14c at a portion corresponding to the respective mounting pieces 28 of the air bag 25. The fixing legs 14c are disposed around the mounting hole 14a. A bolt 42 is inserted into each of the mounting holes 14a. The bolts 42 are utilized for fixing the garnish members 10 and the respective mounting pieces 28 of the air bag 25 to the body 1. The respective fixing legs 14c are inserted into the fixing holes 28b in the respective mounting pieces 28 of the air bag 25. The respective fixing legs 14c take a role for temporarily fixing the bag body 27 of the air bag 25. Additionally, the respective fixing legs 14c also have a role in temporarily fixing a bracket 17 which will be described later.

As shown in FIGS. 7 and 8, the mounting plate 14 has mounting holes 14d. A bolt 43 is inserted into the mounting hole 14d. The bolt 43 is utilized for fixing the mounting piece 29 at the end of the air bag 25 and the garnish member 10 to the body 1. The mounting plate 14 has two fixing holes 14e around the mounting hole 14d. Disposition positions of the respective fixing holes 14e correspond to those of the respective fixing holes 29 in the air bag mounting piece 29. Fixing legs 33b of a pressing plate 33 are inserted into the respective fixing holes 14e. The pressing plate 33 has a role for temporarily fixing the mounting piece 29 to the fixing portion 11. At this time, the respective fixing legs 33b fix the circumferential part around the fixing holes 14e.

The pressing plate 33 has a mounting hole 33a through which the bolt 43 is to be inserted in the center thereof.

Figure 9:
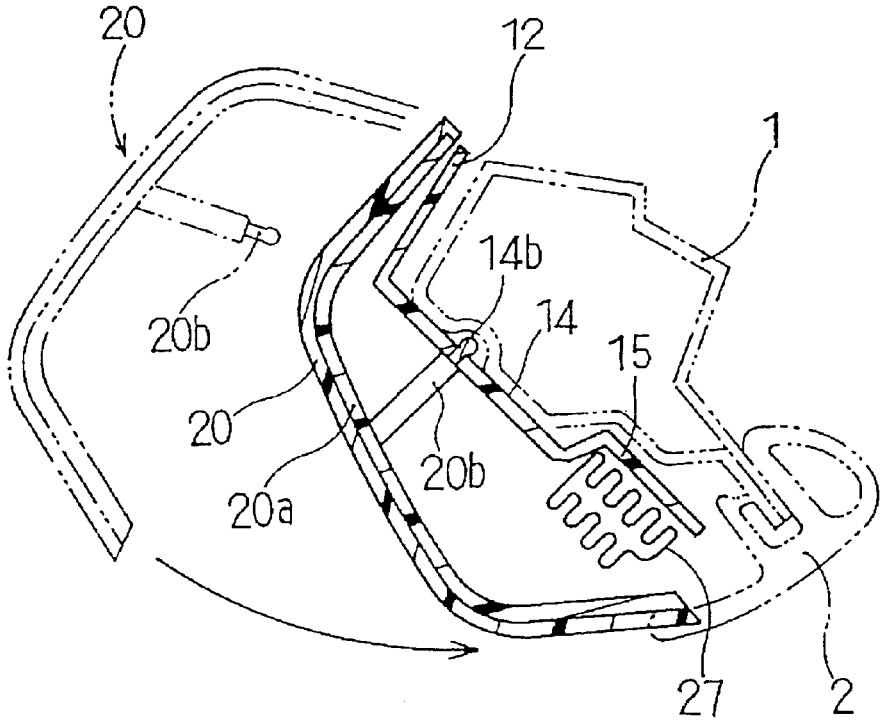
FIG. 9 is a sectional view taken along the lines IX—IX of FIG. 1.

Further, as shown in FIGS. 2 and 9, the mounting plate 14 has a plurality of fixing holes 14b at the edge of the connecting piece 12 thereof. Fixing legs 20b, 21b of the garnish members 20, 21 described later are inserted into these fixing holes 14b. The fixing legs 20b, 21b fix the peripheral part around the fixing holes 14b. Then, the respective fixing legs 20b, 21b prevent the garnish members 20, 21 from being opened except when necessary.

As shown in FIGS. 2–4, the concave storage portion 15 is a portion for storing the bag body 27 of the folded air bag 25. Four brackets 17 are connected at bottom ends of the storage concave portion 15 through integral hinges 16.

The respective brackets 17 comprise a flat-shaped connecting plate 18 and a concave storage portion 19 located on the side of the integral hinge 16. The respective brackets 17 are so structured that when they are rotated with respect to the integral hinges 16 so as to cover the fixing portion 11, the respective connecting plates 18 covering the disposition positions of the respective mounting pieces 28 of the air bag 25.

The respective connecting plates 18 contain mounting holes 18a and fixing holes 18b. The disposition positions or locations of these holes 18a and 18b correspond to those of the mounting holes 28a and the fixing holes 28b in the mounting piece 28. The fixing legs 14c are inserted into the respective fixing holes 18b to fix the respective mounting pieces 28 temporarily. The respective fixing legs 14c fix a peripheral part around the fixing hole 18b. The bolt 42 is inserted into the respective mounting holes 18a. The bolts 42 fix the garnish members 10 and the bag body 27 of the air bag 25 to the body 1.

Figure 10:
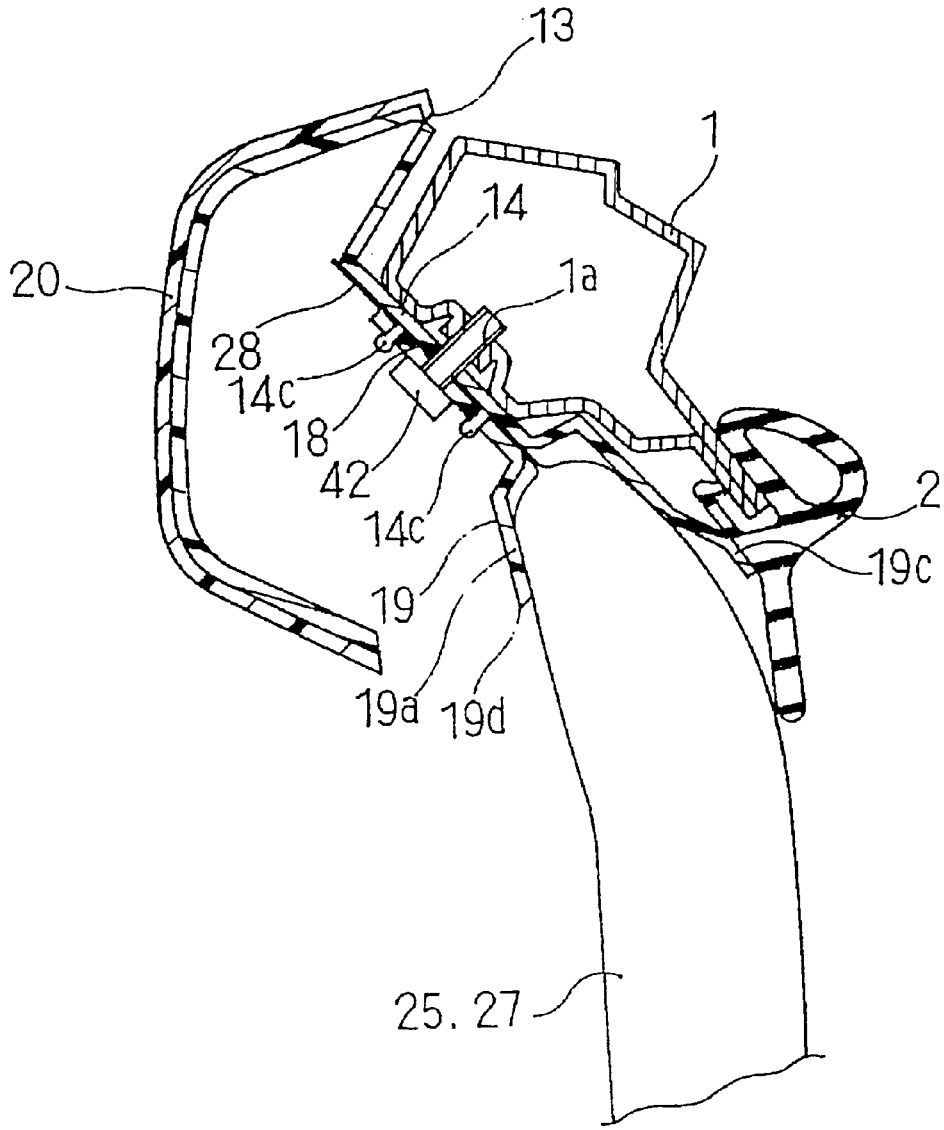
FIG. 10 is a sectional view showing a state in which the air bag is inflated at a position shown in FIG. 3.

The respective concave storage portions 19 have a generally U-shaped cross-section and comprise a bottom wall 19a and two side walls 19b, 19c disposed on both sides of the bottom wall 19a. Thin rupture parts 19d are disposed in the vicinity of an intersection between the side wall 19c and the bottom wall 19a. When the air bag 25 (bag body 27) folded between the storage concave portions is inflated, the rupture parts 19d (FIG. 10) are pressed by the bag body 27 so that they are ruptured.

The garnish bodies 20, 21 have a U-shaped cross section respectively and comprise a base portion 20a, 21a and a surface layer 20c, 21c. The base portions 20a, 21a are connected to the fixing portions 11 via integral hinges 13 (FIG. 3). The surface layers 20c, 21c are bonded to surface sides of the base portions 20a, 21a.

The fixing legs 20b, 21b are formed on rear sides of the respective base portions 20a, 21a. Then, the fixing legs 20b, 21b are inserted into the fixing holes 14b in the mounting plates 14 of the fixing portions 11 so as to fix a peripheral part around the fixing hole 14b (FIG. 9).

Next, a procedure in which the air bag M is temporarily fixed to the garnish members 10 and then fixed to the body 1 of a vehicle will be explained below. At this time, the garnish bodies 20, 21 and the respective brackets 17 are kept open so as to keep them apart from the fixing plates 14 of the fixing portion 11.

First, the inflator 31 is placed within the cylindrical portion 26 by utilizing an insertion hole (not shown) provided in the cylindrical portion 26 of the air bag 25. Further, the clamps 35, 35 are wrapped around the cylindrical portion 26 (FIG. 1).

Then, as shown in FIG. 6, the clips 40 are inserted into the fixing holes 37 of each clamp 35. Further, the clips 40 are inserted into the fixing holes 14g in the fixing portion 11 of the garnish members 10. If the clips 40 fix a peripheral part around the fixing hole 14g, the inflator 31 and the air bag cylindrical portion 26 are temporarily fixed to the fixing portion 11.

At the same time of this temporarily fixing, the bag body 27 of the air bag 25 is folded and inserted into the concave storage portion 15 in the fixing portion 11.

Then, as shown in FIG. 8, the respective fixing holes 29b in the mounting piece 29 located at the end of the air bag 25 are made to correspond to the fixing holes 14e in the mounting plate 14 of the fixing portion 11. Successively, the respective fixing legs 33b of the pressing plate 33 are inserted into the respective fixing holes 29b, 14e and fixed by peripheral parts around the respective fixing holes 14e. As shown in FIG. 2, the fixing legs 14c of the mounting plate 14 are inserted into the fixing holes 28b in the mounting piece 28 of the airbag 25. Further, the respective brackets 17 are bent so as to cover the mounting plate 14 of the fixing portion 11 such that the respective fixing legs 14c are inserted into the respective fixing holes 18b in the connecting plate 18 and the respective fixing legs 14c are fixed by a peripheral part around the fixing holes 18b. Consequently, the bag body 27 of the air bag 25 is temporarily fixed to the fixing portion 11.

Next, the fixing legs 20b, 21b of the respective garnish bodies 20, 21 are inserted into the fixing holes 14b in the fixing plates 14 of the corresponding fixing portion 11 such that they are fixed by a peripheral part around the respective fixing holes 14b. Consequently, an assembly A1 (see FIG. 5) in which the air bag apparatus M is contained in the garnish members 10 is formed.

When the garnish members 10 are installed and fixed to the body 1 for assembly work for vehicles or the like reason, the respective fixing legs 20b, 21b are removed from the fixing holes 14b and then the garnish bodies 20, 21 are opened. As shown in FIG. 3, the four bolts 42 are engaged with the mounting holes 1a in the body 1 via the mounting holes 18a in the respective brackets 17, then, the mounting holes 28a in the respective mounting pieces 28 and finally the respective mounting holes in the mounting plates 14 of the fixing portion 11. As shown in FIG. 7, the single bolt 43 is engaged with the mounting hole 1b in the body 1 via the mounting hole 33a in the pressing plate 33, then, the mounting hole 29a in the mounting piece 29 and finally the mounting hole 14d in the mounting plate 14 of the fixing portion 11. Further, as shown in FIG. 5, the two bolts 44 are engaged with the mounting holes 1c in the body 1 via the mounting holes 36 in the respective clamps 35 and the mounting holes 14f in the mounting plates 14 of the fixing portion 11. Consequently, the garnish members 10 and the air bag apparatus M can be installed and fixed to the body 1.

Then, the respective garnish bodies 20, 21 are closed such that the respective fixing legs 20b, 21b are inserted into the fixing hole 14b in the mounting plate 14 of the fixing portion 11 and fixed by a peripheral part around the fixing holes 14b. Consequently, installation and fixing of the garnish members 10 and the air bag apparatus M to the body 1 is completed. Meanwhile, a lead wire for inputting a predetermined activation signal is connected to the inflator 31.

After that, if the activation signal is input to the inflator 31, gas is injected from the gas injecting port 31a. Then, the bag body 27 of the air bag 25 ruptures the rupture part 19d of the respective brackets 17 so that the respective garnish bodies 20, 21 are opened. Then, the bag body 27 is inflated as shown by a two-dots-and-dash line in FIG. 1, 2 and FIG. 10.

With the garnish members 10 according to a first embodiment of the present invention, as described above, before the garnish members 10 are fixed to the body 1, the air bag apparatus M is temporarily fixed to the mounting plate 14 of the fixing portion by utilizing the fixing legs 33b in the pressing plate 33, the clips 40 for fastening the clamps 35 which connect the air bag 25 with the inflator 31, and the fixing legs 14c. Thus, by disposing the fixing portion 11 of the garnish members 10 on the body 1, it is possible to dispose the air bag apparatus M at a predetermined position. As a result, the installation and fixing of the air bag apparatus M and the garnish members 10 can be achieved easily.

The garnish members 10 according to the first embodiment can be handled as the assembly A1 containing the air bag apparatus M by such a temporary fixing. Thus, it is convenient for transportation, storage and the like until this assembly is installed and fixed to vehicles.

Further, according to the first embodiment, the bolts 42, 43, 44 as means for fixing the air bag 25 and the inflator 31 of the air bag apparatus M to the body 1 are utilized commonly as means for fixing the garnish members 10 to the body 1. Thus, it is possible to reduce a number of parts necessary for the fixing work and a number of working steps.

Further, according to the first embodiment, the folded bag body 27 of the air bag 25 is pressed by the brackets 17 located at a plurality of positions. Thus, there is never a situation when the garnish bodies 20, 21 are opened so that the bag body 27 drops into the cabin.

Next a second embodiment of the present invention will be described. In the garnish members 50 according to the second embodiment, as shown in FIGS. 11–16, the fixing portion 11 of the garnish members 10 according to the first embodiment is divided. Thus, the garnish members 50 of the second embodiment can achieve lighter weight than the garnish members 10 of the first embodiment.

That is, five fixing portions 51, 65 are formed and installed. The fixing portions 51, 65 are hinged to upper edges of rear faces of the elongated garnish bodies 60, 61 disposed in a cabin. The four fixing portions 51 are disposed at respective positions corresponding to respective mounting pieces 28 in which the bag body 27 of the air bag 25 is to be installed. The single fixing portion 65 is disposed in a position corresponding to a cylindrical portion 26 of the air bag 25.

Figure 12:
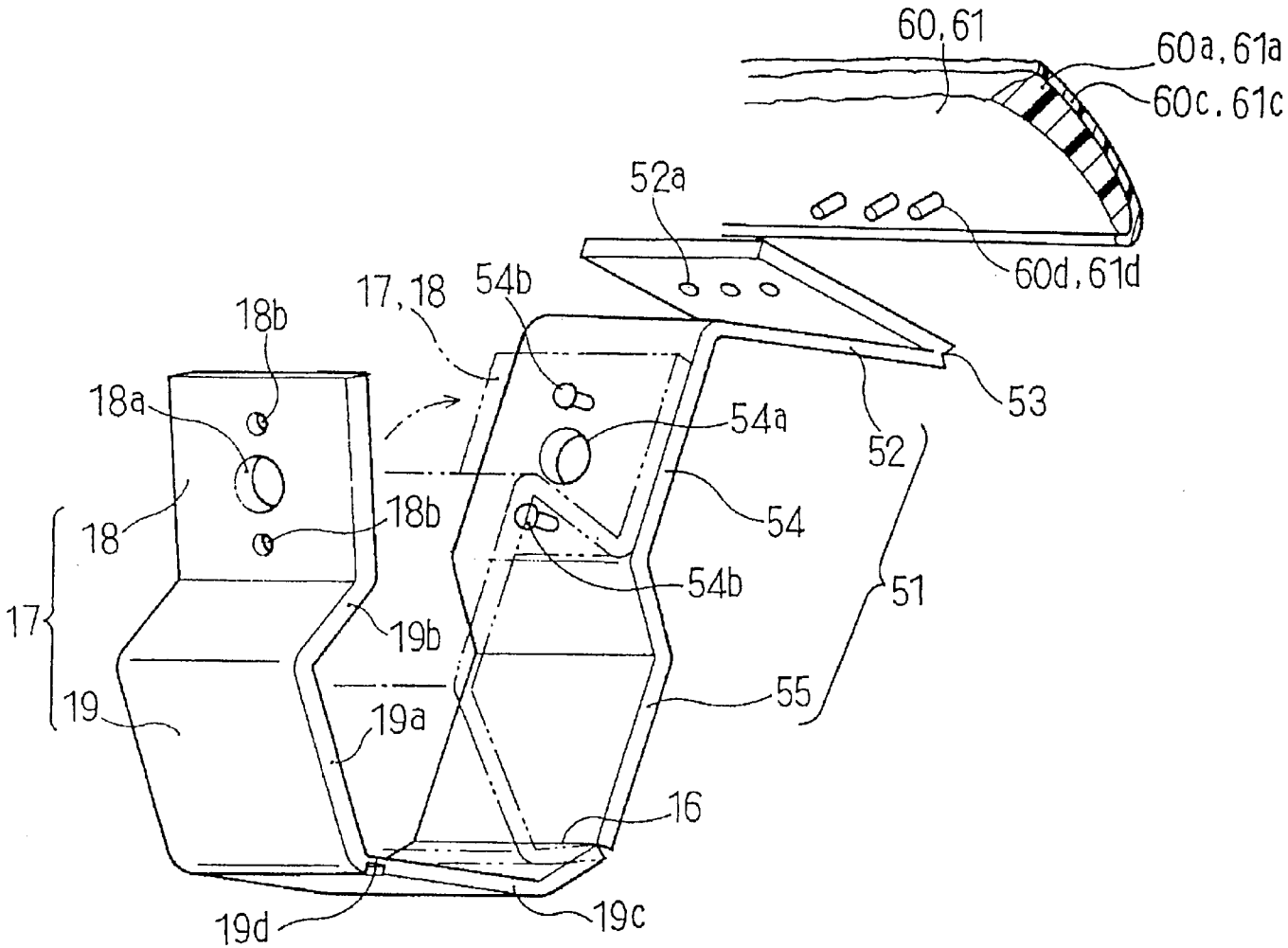
FIG. 12 is a partial disassembly perspective view of the same embodiment as above.
Figure 13:
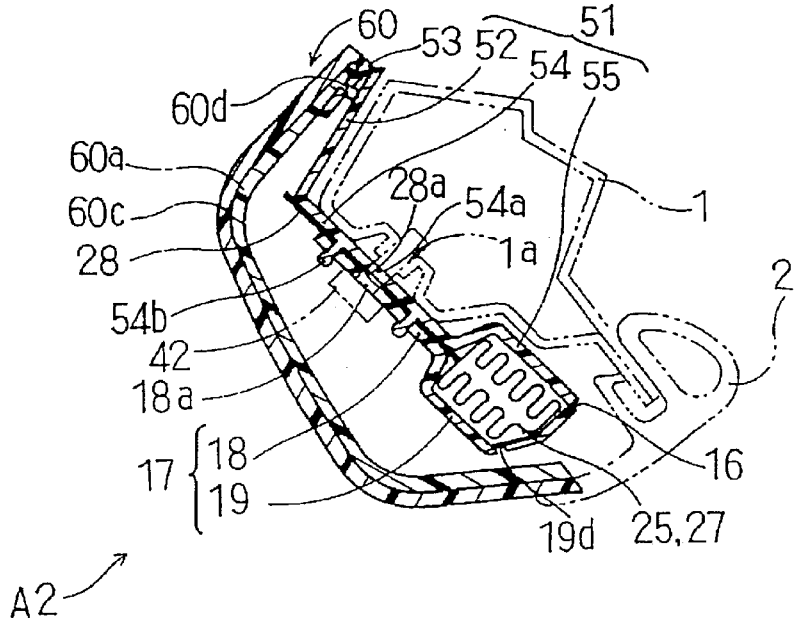
FIG. 13 is a sectional view of the second embodiment corresponding to FIG. 3.
Figure 14:
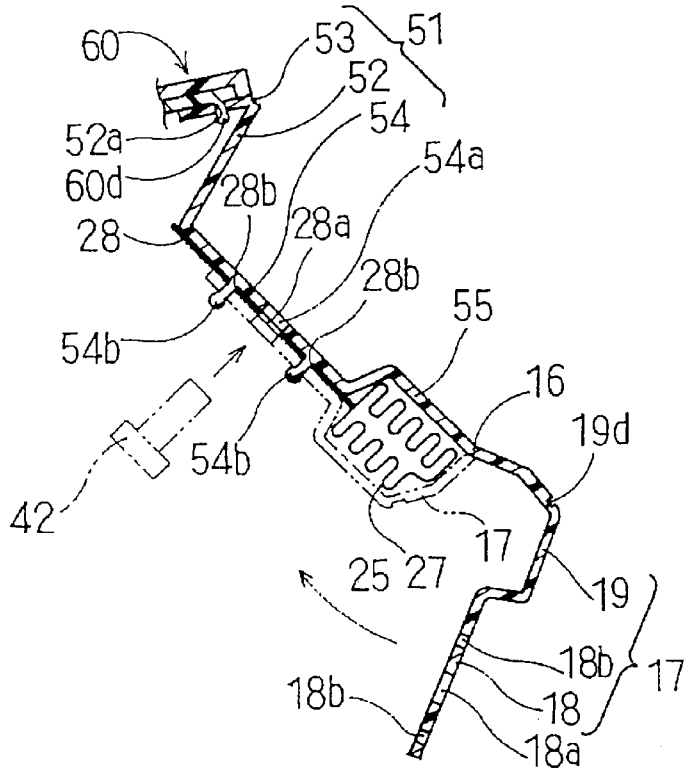
FIG. 14 is a view showing a state in which the air bag is temporarily fixed at a position shown in FIG. 13.

The respective fixing portions 51 are formed of synthetic resin such as polypropylene and as shown in FIGS. 12–14, comprise a mounting plate 54, a connecting piece 52 and a concave storage portion 55. The mounting plate 54 is a portion to be fixed to the body 1. The connecting piece 52 is a portion to be connected with the garnish bodies 60, 61. The concave storage portion 55 extends with a L-shaped cross-section below a bottom edge of the mounting plate 54.

The respective connecting pieces 52 are formed in an inverse V-shaped cross-section having an integral hinge 53. The respective connecting pieces 52 have three connecting holes 52a at a part on the side of the garnish bodies 60, 61. Connecting legs 60d, 61d formed on base portions 60a, 61a of the garnish bodies 60, 61 are inserted into the respective connecting holes 52a. Then, the respective connecting legs 60d, 61d are thermally caulked so as to expand front ends thereof, so that the garnish bodies 60, 61 are connected with the respective connecting pieces 52.

The garnish bodies 60, 61 are formed of synthetic resin such as polypropylene like the garnish bodies 20, 21 according to the first embodiment, and comprise base portions 60a, 61a and surface layers 60c, 61c. The base portions 60a, 61a have a U-shaped cross-section. The surface layers 60c, 61c are bonded to surface sides of the base portions 60a, 61a. Fixing legs 60b, 61b and the aforementioned connecting legs 60d, 61d are formed at each predetermined position on the base portions 60a, 61a. The fixing legs 60b, 61b are inserted into each of fixing holes 1d (see FIG. 11) formed on the body 1 such that they are fixed by a peripheral part around the fixing holes 1d.

The respective mounting plates 54 have a mounting hole 54a and two fixing legs 54b. Bolts 54a corresponding to mounting holes 28a in mounting pieces 28 are inserted into the mounting holes 54a. The respective fixing legs 54b are inserted into fixing holes 28b in the fixing piece 28 and the fixing holes 18b in the brackets 17 so that they are fixed by a peripheral part around the fixing holes 18b.

The respective concave storage portions 55 are a portion for storing the bag body 27 of the folded air bag 25. Brackets 17 are connected with bottom ends of the respective concave storage portions 55 via an integral hinge 16.

The respective brackets 17 comprise a connecting plate 18 having a mounting hole 18a and fixing holes 18b, and a storage concave portion 19 having a bottom wall 19a, side walls 19b, 19c and a rupture expected portion 19d.

Figure 11:
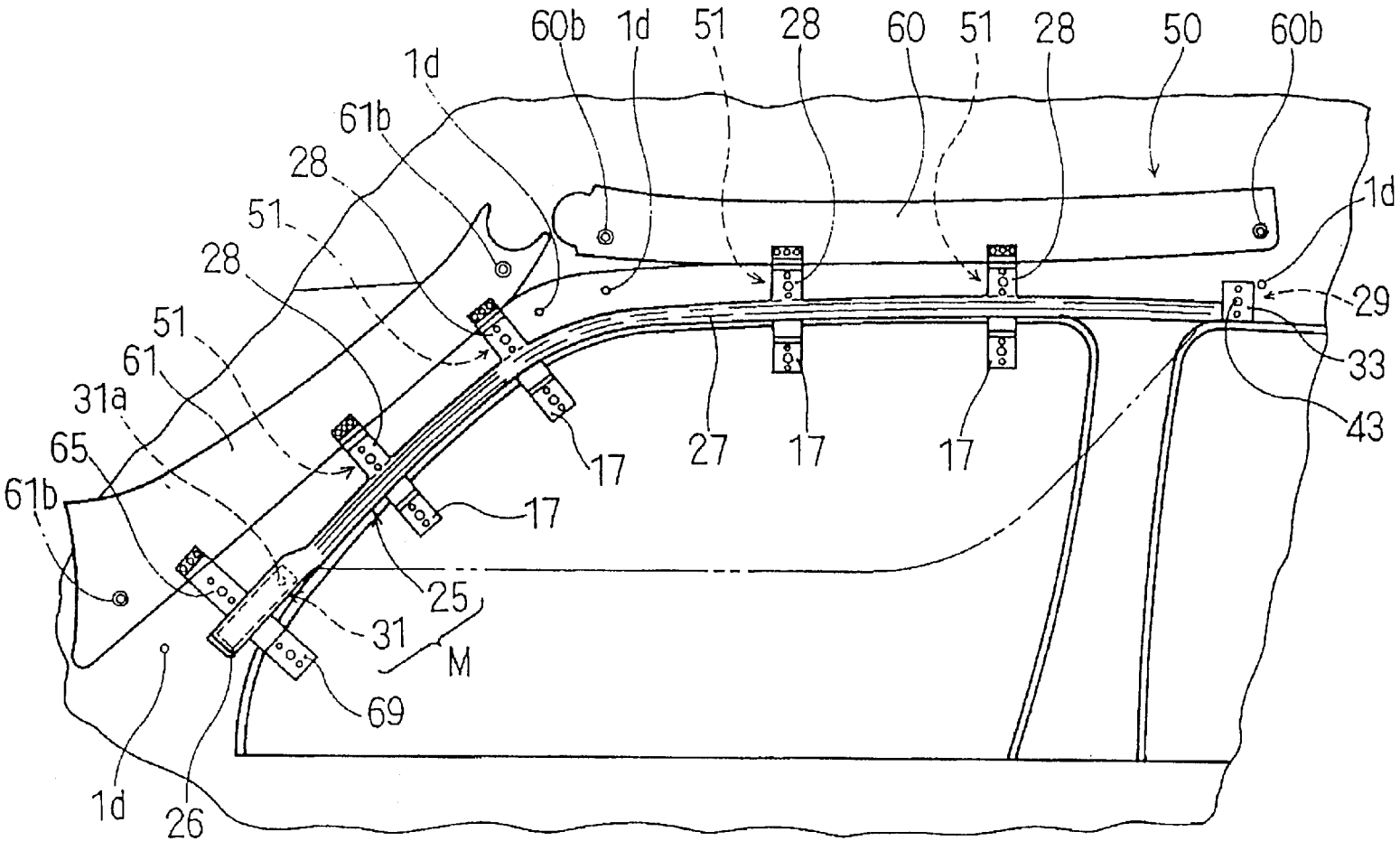
FIG. 11 is a view showing a state in which garnish members according to the second embodiment of the present invention and brackets are opened from the fixing portions.
Figure 15:
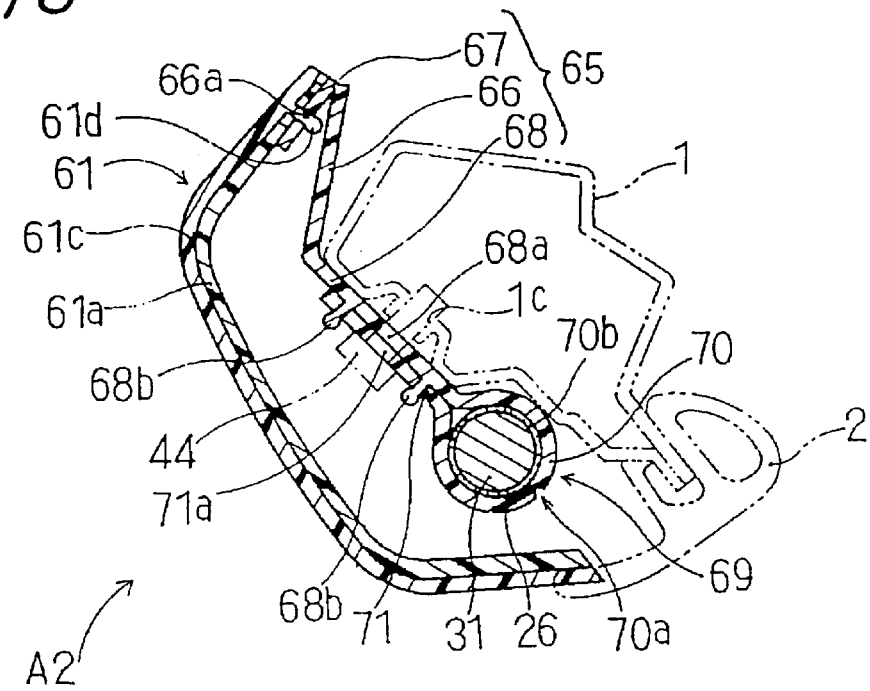
FIG. 15 is a sectional view of the second embodiment corresponding to FIG. 5.
Figure 16:
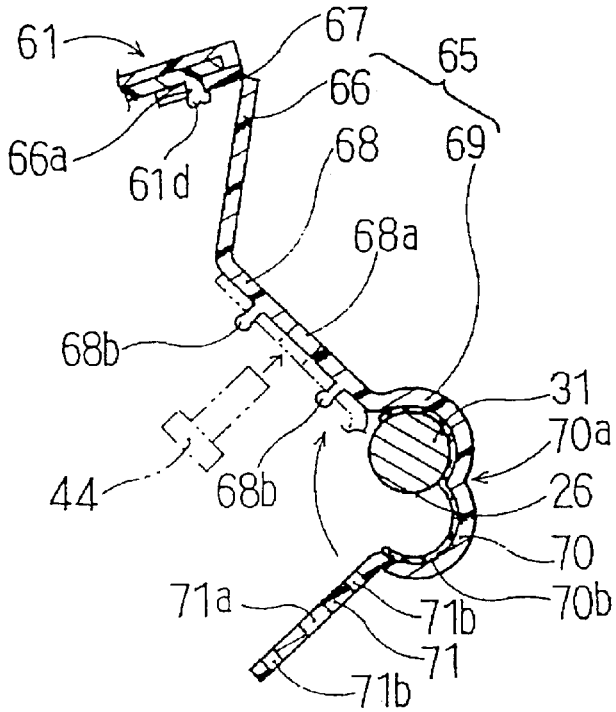
FIG. 16 is a view showing a state in which the air bag is temporarily fixed at a position shown in FIG. 15.

Fixing portions 65 are formed of synthetic resin such as polypropylene and comprise a mounting plate 68, a connecting piece 66 and a clamping portion 69 as shown in FIGS. 11, 15, 16. The mounting plate 68 is a portion to be fixed to the body 1. The connecting piece 66 is a hi portion located on a side of the garnish body 61. The clamping portion 69 extends with a substantially U-shaped cross-section from a bottom edge of the mounting plate 68.

The connecting piece 66 has an inverse V-shaped cross-section having an integral hinge 67 like the connecting piece 52 of the fixing portion 51. The connecting piece 66 has three connecting holes 66a for inserting the connecting legs 61d of the garnish member 61.

The mounting plates 68 have a mounting hole 68a and two fixing legs 68b. A bolt 44 is inserted into the mounting holes 68a. The respective fixing legs 68b are inserted into fixing holes 71b of the clamping portions 69 so that they are fixed by a peripheral part around the fixing holes 71b.

The clamping portions 69 comprise a storage concave portion 70 and a connecting plate 71. The storage concave portion 70 is a portion shaped in a substantially circular form and wraps the inflator 31 and the cylindrical portion 26 of the air bag 25. The storage concave portion 70 has a thin portion 70a for making it easy to be opened. A cushioning member 70b is bonded to an internal surface of the storage concave portion 70. The connecting plates 71 have a mounting hole 71a and fixing holes 71b. The mounting holes 71a are disposed corresponding to the mounting hole 68a in the mounting plate 68. The bolts 44 are inserted into the mounting holes 71a. The fixing legs 68b on the mounting plate 68 are inserted into the fixing holes 71b so that the fixing legs 68b fix a peripheral part around the fixing holes 71b.

In the garnish members 50 according to the second embodiment, when the air bag apparatus M is to be fixed temporarily, the connecting pieces 52, 66 of the fixing portions 51, 65 are connected with the garnish bodies 60, 61 by utilizing thermal caulking. Further, the respective garnish bodies 60, 61 and the respective brackets 17 and the connecting plates 71 are kept open to keep them apart from the mounting plates 54, 68 of the respective fixing portions 51, 65.

An inflator 31 is disposed within a cylindrical portion 26 by utilizing an insertion hole (not shown) provided in a cylindrical portion 26 of the air bag 25. The cylindrical portion 26 is disposed in the storage concave portion 70 of the clamping portion 69. After that, the connecting plates 71 are bent so as to cover the connecting plates 68 such that the respective fixing legs 68b on the connecting plates 68 are inserted into the fixing holes 71b and fixed by a peripheral part around the fixing holes 71b.

Then, the bag body 27 of the air bag 25 is folded and inserted into the storage concave portion 55 of the fixing portion 51.

Then, the respective fixing legs 33b are inserted into the respective fixing holes 29b in the mounting piece 29 located at an end of the air bag 25 and fixed in a peripheral part around the fixing holes 29b such that the pressing plate 33 is installed onto the mounting piece 29. As shown in FIG. 14, the fixing legs 54b of the mounting plate 54 of the fixing portion 51 are inserted into the fixing holes 28b in the respective mounting piece 28b of the corresponding air bag 25. Further, the brackets 17 are bent so as to cover the respective fixing portions 51 and the respective fixing legs 54b are inserted into the respective fixing holes 18b in the connecting plate 18 and fixed in a peripheral part around the fixing holes 18b such that the bag body 27 of the air bag 25 is temporarily fixed to the respective fixing portions 51.

Then, an assembly A2 (see FIG. 15, 13) in which the air bag apparatus M is temporarily fixed to the respective fixing portions 51, 65 of the garnish member 50 is formed.

When the garnish member 50 is installed and fixed for assembly work of vehicles, first the garnish bodies 60, 61 are opened. Then, as shown in FIG. 13, the four bolts 42 are engaged with the fixing holes 1a of the body 1 via the mounting holes 18a in the respective brackets 17, the mounting holes 28a in the respective mounting pieces 28, and the respective mounting holes 54a in the mounting plates 54 of the respective fixing portions 51. Further, in FIG. 7 where the mounting plate 14 is used, the single bolt 43 is engaged with the mounting hole 1b of the body 1 via the mounting hole 33a in the pressing plate 33 and the mounting hole 29a in the mounting piece 29. Still further, as shown in FIG. 15, the single bolt 44 is engaged with the mounting hole 1c of the body 1 via the mounting hole 71a in the clamping portion 69, and the mounting hole 68a in the mounting plate 68 of the fixing portion 65. Consequently, the garnish members 50 and the air bag apparatus M can be installed and fixed to the body 1.

Then, the respective garnish bodies 60, 61 are closed and the respective fixing legs 60b, 61b are inserted into the fixing holes 1d provided in the body 1 and fixed in a peripheral part around the fixing holes 1d. Consequently, installation and fixing of the garnish members 50 and the air bag apparatus M to the body 1 can be achieved. Meanwhile, a lead wire for inputting a predetermined activation signal is connected to the inflator 31.

After that, if the activation signal is input to the inflator 31, gas is injected from the gas injecting port 31a. Then, the bag body 27 of the air bag 25 ruptures the rupture part 19b of the respective brackets 17 so that the respective garnish bodies 60, 61 are opened. Then, the bag body 27 is inflated as shown by a two-dots-and-dash line in FIG. 11.

With the garnish members 50 according to the second embodiment of the present invention, as described above, prior to installation thereof onto the body 1, the air bag 25 and the inflator 31 are temporarily fixed to the fixing portions 51, 65. Thus, by disposing the garnish members 50 on the body 1, the air bag apparatus M can be automatically disposed at a predetermined position. That is, the second embodiment of the present invention provides the same action and effect as the first embodiment that the air bag apparatus M and the garnish member 50 can be installed and fixed to the body 1 easily. Further, if the divided fixing portions 51, 65 are utilized, a weight of the garnish members 50 can be reduced.

The second embodiment of the present invention indicates such an embodiment in which the inflator 31 and the cylindrical portion 26 of the air bag 25 are temporarily fixed to the fixing portions 65. However, it is permissible to eliminate the fixing portion 65, fit the two clamps to the cylindrical portion 26, and fix the clamps 35, 35 directly onto the body 1 by utilizing the two bolts 44. In this case, the air bag cylindrical portion 26 and the inflator 31 are temporarily fixed to only the respective fixing portions 51 via the bag body 27 of the air bag 25 temporarily fixed to the respective fixing portions 51. Even with such a construction, the same action and effect as those already described can be attained.

Then, the same construction may be applied to the first embodiment. That is, it is permissible to eliminate the fixing portion 11, fit the two clamps 35 to the cylindrical portion 26, and fix the clamps 35, 35 directly onto the body 1 by utilizing the two bolts 44. In this case, the air bag cylindrical portion 26 and the inflator 31 are temporarily fixed to only the fixing portion 11 via the bag body 27 of the air bag 25 temporarily fixed to the fixing portion

What is claimed is:

1. Garnish members having an air bag therein, the garnish members being constructed and arranged to be installed and fixed to peripheries of a door opening in an interior of a vehicle body, said garnish members comprising:

elongate garnish bodies adapted to be disposed in the interior of the vehicle body;

at least one fixing portion hinged to said garnish bodies at an outward side of said garnish bodies, said fixing portion being constructed and arranged to be fixed to the vehicle body, said fixing portion also being constructed and arranged to temporarily fix said air bag to the vehicle body so that said air bag can be mounted on said body; and brackets provided at said fixing portion so as to maintain a folded condition of said air bag, said brackets being constructed and arranged to be ruptured when said air bag is inflated.

2. Garnish members as claimed in claim 1, further comprising means for installing said air bag to said body and means for installing said at least one fixing portion to said body.

3. Garnish members as claimed in claim 1, wherein said at least one fixing portion comprises:

a connecting piece to be connected to said garnish body;

a connecting plate connected to said connecting piece, said plate having a plurality of fixing legs and a mounting hole through for receiving a bolt for use in installation to said body; and a concave storage portion constructed and arranged to store the air bag in a folded condition connected to one of said brackets, and said one bracket is hinged with respect to said concave storage portion thereby forming a hinged portion and comprises:

a plurality of fixing holes for fixing said fixing legs;

a mounting hole through which said bolt can be inserted; and a rupture part constructed and arranged to be ruptured when said air bag is inflated, said air bag being stored in said concave storage portion in a folded condition and being temporarily fixed to said fixing portion by turning said bracket with respect to said hinged portion of said bracket so as to fix said fixing legs to peripheral parts around said fixing holes, and further said air bag stored in said concave storage portion in a folded condition being mounted to said body by tightly engaging said bolt to said body via mounting holes in said bracket and in said connecting plate.

4. Garnish members as claimed in claim 1, wherein said at least one fixing portion is divided into plural sections and a plurality of said plural sections of said fixing portions are disposed on an outward side of said garnish body.

5. Garnish members as claimed in claim 1, wherein said fixing portion is divided into plural sections and a plurality of said plural sections of said fixing portions are disposed on an outward side of said garnish body and said fixing portions comprise:

a connecting piece to be connected to said garnish body;

a connecting plate connected to said connecting piece, the plate having a plurality of fixing legs and a mounting hole for receiving a bolt for use in installation to said body; and a concave storage portion capable of storing said air bag in a folded condition connected to at least one of said brackets, and said one bracket being hinged with respect to said concave storage portion and comprises: fixing holes for fixing said fixing legs;

a mounting hole for receiving said bolt; and a rupture part constructed and arranged to be ruptured when said air bag is inflated, said air bag stored in said storage concave portion in a folded condition being temporarily fixed to said fixing portions by turning one said bracket with respect to said hinged portion so as to fix said fixing legs to peripheral parts around said fixing holes, and further said air bag stored in said storage concave portion in a folded condition being capable of being mounted to said body by tightly engaging said bolt to said body via mounting holes in said bracket and in said connecting plate.

6. Garnish members having an air bag therein, the garnish members being installed and fixed to peripheries of a door opening in an interior of a vehicle body, said garnish members comprising:

elongate garnish bodies disposed in the interior of the vehicle body;

fixing portions hinged to said garnish bodies at an outward side of said garnish bodies, said fixing portions being fixed to the vehicle body, said fixing portions temporarily fixing said air bag to the vehicle body so that said air bag can be mounted on said body; and brackets provided at said fixing portions so as to maintain a folded condition of said air bag, said brackets being constructed and arranged to be ruptured when said air bag is inflated.

*7. An air bag containing system comprising garnish members being constructed and arranged to be installed and fixed to peripheries of a door opening in an interior of a vehicle body,*

*at least one fixing member constructed and arranged to be fixed to the vehicle body, said fixing member also being constructed and arranged to fix said air bag to the vehicle body so that said air bag can be mounted on said body,*

*holding members provided to maintain a folded condition of said air bag, said holding members being constructed and arranged to be ruptured when said air bag is inflated, and*

*elongate garnish bodies adapted to be disposed in the interior of the vehicle body and*

*wherein said at least one fixing member comprises:*

*a connecting piece to be connected to said garnish body;*

*a connecting plate connected to said connecting piece, said plate having a plurality of fixing legs and a mounting hole through for receiving a bolt for use in installation to said body; and*

*a concave storage portion constructed and arranged to store the air bag in a folded condition connected to one of said holding members, and said one holding member is hinged with respect to said concave storage portion thereby forming a hinged portion and comprises:*

*a plurality of fixing holes for fixing said fixing legs;*

*a mounting hole through which said bolt can be inserted; and*

*a rupture part constructed and arranged to be ruptured when said air bag is inflated, said air bag being stored in said concave storage portion in a folded condition and being temporarily fixed to said fixing member by turning said holding member with respect to said hinged portion of said holding member so as to fix said fixing legs to peripheral parts around said fixing holes, and further said air bag stored in said concave storage portion in a folded condition being mounted to said body by tightly engaging said bolt to said body via mounting holes in said holding member and in said connecting plate.*

*8. An air bag containing system comprising garnish members being constructed and arranged to be installed and fixed to peripheries of a door opening in an interior of a vehicle body,*

*at least one fixing member constructed and arranged to be fixed to the vehicle body, said fixing member also being constructed and arranged to fix said air bag to the vehicle body so that said air bag can be mounted on said body,*

*holding members provided to maintain a folded condition of said air bag, said holding members being constructed and arranged to be ruptured when said air bag is inflated, and*

*elongate garnish bodies adapted to be disposed in the interior of the vehicle body, and*

*wherein said at least one fixing member is divided into plural sections and a plurality of said plural sections of said fixing member are disposed on an outward side of said garnish body.*

*9. An air bag containing system as claimed in claim 8, wherein said at least one fixing member comprises:*

*a connecting piece to be connected to said garnish body;*

*a connecting plate connected to said connecting piece, the plate having a plurality of fixing legs and a mounting hole for receiving a bolt for use in installation to said body; and*

*a concave storage portion capable of storing said air bag in a folded condition connected to at least one of said holding members, and said one holding member being hinged with respect to said concave storage portion and comprises:*

*fixing holes for fixing said fixing legs;*

*a mounting hole for receiving said bolt; and*

*a rupture part constructed and arranged to be ruptured when said air bag is inflated, said air bag stored in said storage concave portion in a folded condition being temporarily fixed to said at least one fixing member by turning one said holding member with respect to said hinged portion so as to fix said fixing legs to peripheral parts around said fixing holes, and further said air bag stored in said storage concave portion in a folded condition being capable of being mounted to said body by tightly engaging said bolt to said body via mounting holes in said holding member and in said connecting plate.*

*10. An air bag containing system having an air bag therein,*

*the air bag containing system being constructed and arranged to be installed and fixed to peripheries of a door opening in an interior of a vehicle body and comprising,*

*at least one fixing member constructed and arranged to be fixed to the vehicle body, said fixing member also being constructed and arranged to fix said air bag to the vehicle body so that said air bag can be mounted on said body;*

*holding members provided to maintain a folded condition of said air bag, said holding members being constructed and arranged to be ruptured when said air bag is inflated; and*

*elongate garnish bodies adapted to be disposed in the interior of the vehicle body and*

*wherein said at least one fixing member comprises:*

*a connecting piece to be connected to said garnish body;*

*a connecting plate connected to said connecting piece, said plate having a plurality of fixing legs and a mounting hole through for receiving a bolt for use in installation to said body; and*

*a concave storage portion constructed and arranged to store the air bag in a folded condition connected to one of said holding members, and said one holding member is hinged with respect to said concave storage portion thereby forming a hinged portion and comprises:*

*a plurality of fixing holes for fixing said fixing legs;*

*a mounting hole through which said bolt can be inserted; and*

*a rupture part constructed and arranged to be ruptured when said air bag is inflated, said air bag being stored in said concave storage portion in a folded condition and being temporarily fixed to said fixing member by turning said holding member with respect to said hinged portion of said holding member so as to fix said fixing legs to peripheral parts around said fixing holes, and further said air bag stored in said concave storage portion in a folded condition being mounted to said body by tightly engaging said bolt to said body via mounting holes in said holding member and in said connecting plate.*

*11. An air bag containing system having an air bag therein,*

*the air bag containing system being constructed and arranged to be installed and fixed to peripheries of a door opening in an interior of a vehicle body and comprising,*

*at least one fixing member constructed and arranged to be fixed to the vehicle body, said fixing member also being constructed and arranged to fix said air bag to the vehicle body so that said air bag can be mounted on said body;*

*holding members provided to maintain a folded condition of said air bag, said holding members being constructed and arranged to be ruptured when said air bag is inflated; and*

*elongate garnish bodies adapted to be disposed in the interior of the vehicle body, and*

*wherein said at least one fixing member is divided into plural sections and a plurality of said plural sections of said fixing member are disposed on an outward side of said garnish body.*

*12. An air bag containing system as claimed in claim 11, wherein said at least one fixing member comprises:*

*a connecting piece to be connected to said garnish body;*

*a connecting plate connected to said connecting piece, the plate having a plurality of fixing legs and a mounting hole for receiving a bolt for use in installation to said body; and*

*a concave storage portion capable of storing said air bag in a folded condition connected to at least one of said holding members, and said one holding member being hinged with respect to said concave storage portion and comprises:*

*fixing holes for fixing said fixing legs;*

*a mounting hole for receiving said bolt; and*

*a rupture part constructed and arranged to be ruptured when said air bag is inflated, said air bag stored in said storage concave portion in a folded condition being temporarily fixed to said at least one fixing member by turning one said holding member with respect to said hinged portion so as to fix said fixing legs to peripheral parts around said fixing holes, and further said air bag stored in said storage concave portion in a folded condition being capable of being mounted to said body by tightly engaging said bolt to said body via mounting holes in said holding member and in said connecting plate.*

*13. An air bag containing system to be fixed to peripheries of a door opening in an interior of a vehicle body, said air bag containing system comprising*

*garnish members being constructed and arranged to be installed and fixed to the peripheries of a door opening in an interior of a vehicle body,*

*an air bag, an inflator for supplying inflation gas to said air bag, and at least one band-shaped member,*

*wherein said air bag comprises an inflatable bag body, and a plurality of mounting parts to be fixed to the vehicle body, and*

*said at least one band-shaped member can be ruptured, has at least two end sides, and surrounds said bag body.*

*14. An air bag containing system according to claim 13, wherein said band shaped member maintains said bag body in a folded state.*

*15. An air bag containing system according to claim 13, wherein said band-shaped member is provided at both end sides with plates capable of being mutually fastened and coupled, and both plates are coupled with each other thereby surrounding said bag body.*

*16. An air bag containing system according to claim 15, wherein said plates on both end sides of said band-shaped member are fixed to the vehicle body by a bolt inserted into mounting holes provided on both plates and engaged with the vehicle body.*

*17. An air bag containing system according to claim 16, wherein each mounting part of said air bag is provided with a mounting hole into which said bolt is inserted, and said mounting part is grasped between said plates on both end sides of said band-shaped member, and said bolt is inserted into the mounting hole thereby fixing said mounting part to the vehicle body.*

*18. An air bag containing system according to claim 13, wherein the band-shaped member is formed of synthetic resin, and*

*a thin rupture expected portion, which is constructed to be ruptured when said bag body is inflated, is present in the part surrounding said bag body.*

*19. An air bag containing system to be fixed to peripheries of a door opening in an interior of a vehicle body, said air bag containing system comprising*

*garnish members being constructed and arranged to be installed and fixed to the peripheries of a door opening in an interior of a vehicle body,*

*an air bag, an inflator for supplying inflation gas to said air bag and a pair of plates,*

*wherein said air bag comprises an inflatable bag body and a plurality of individual mounting parts to be fixed to the vehicle body, and*

*said pair of plates are fixed to individual mounting parts so as to grasp said individual mounting parts and said air bag together with said pair of plates.*

*20. An air bag containing system according to claim 19, wherein said each individual mounting part and said pair of*

*plates grasping said each individual mounting part are fixed to the vehicle body by bolts inserted into mounting holes provided on the plates and engaged with the vehicle body.*

*21. An air bag containing system according to claim 19, wherein said pair of plates are coupled with each other interposing the parts surrounding said folded bag body therebetween.*

*22. An air bag containing system according to claim 21, wherein a thin rupture expected portion, which is constructed to be ruptured when said bag body is inflated, is formed in the parts surrounding said folded bag body.*

*23. A system for holding an air bag to the peripheries of a door opening in the interior of a vehicle body comprising*

*garnish members attached to the peripheries of the door opening in the interior of a vehicle body;*

*fixing members fixably attaching said air bag to the vehicle body so that said air bag can be mounted to the vehicle body; and*

*holding members maintaining a folded condition of said air bag, said holding members being constructed and arranged to be ruptured when said air bag is inflated, and*

*wherein said holding members and said fixing members are unitary.*

* * * * *